(12) United States Patent
Edelman et al.

(10) Patent No.: US 10,563,980 B2
(45) Date of Patent: Feb. 18, 2020

(54) ENHANCED REMOTE SURVEYING SYSTEMS AND METHODS

(71) Applicant: Topcon Positioning Systems, Inc., Livermore, CA (US)

(72) Inventors: Leonid Valerianovich Edelman, Saint-Petersburg (RU); Jason Hallett, Dublin, CA (US); Alok Srivastava, Livermore, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 406 days.

(21) Appl. No.: 15/389,877

(22) Filed: Dec. 23, 2016

(65) Prior Publication Data
US 2018/0180416 A1 Jun. 28, 2018

(51) Int. Cl.
| | |
|---|---|
| *G01S 19/47* | (2010.01) |
| *G01C 15/00* | (2006.01) |
| *G01S 19/53* | (2010.01) |
| *G01S 19/49* | (2010.01) |
| *G01S 19/48* | (2010.01) |

(52) U.S. Cl.
CPC ............ *G01C 15/002* (2013.01); *G01S 19/47* (2013.01); *G01S 19/53* (2013.01); *G01C 15/008* (2013.01); *G01S 19/48* (2013.01); *G01S 19/49* (2013.01)

(58) Field of Classification Search
CPC .......... G01S 19/47; G01S 19/53; G01S 19/48; G01S 19/49; G01C 15/002; G01C 15/008; G01C 11/02
USPC ............................ 342/357.3, 357.31, 357.32
See application file for complete search history.

(56) References Cited

U.S. PATENT DOCUMENTS

| | | | | |
|---|---|---|---|---|
| 5,512,905 | A | * | 4/1996 | Nichols .................. G01C 15/06 33/366.12 |
| 5,739,785 | A | | 4/1998 | Allison et al. |
| 6,163,294 | A | | 12/2000 | Talbot |
| 7,978,128 | B2 | * | 7/2011 | Scherzinger ........... G01C 15/00 342/357.23 |

(Continued)

OTHER PUBLICATIONS

N. Brown et al.,"Monitoring of Open Pit Mines Using Combined GNSS Satellite Receivers and Robotic Total Stations," downloaded from http://w3.leica-geosystems.com/downloads,14 pages.

(Continued)

*Primary Examiner* — Chuong P Nguyen
(74) *Attorney, Agent, or Firm* — Chiesa Shahinian & Giantomasi PC

(57) ABSTRACT

A method and apparatus utilizing a high-precision GNSS receiver, an EDM, and an optical camera in combination for making accurate measurements of multiple remote points. The accurate measurement of a plurality of remote points is facilitated by integrating a high-precision GNSS receiver, an EDM and an optical camera such that their combined physical location and orientation can be measured and known, and allowing for a single calibration thereof. The integration of the high-precision GNSS receiver, an EDM, and an optical camera may take various forms such as a single, integrated device, or individual devices assembled together on a surveying pole, for example. The integrated device may also include one or more sensors such as an inclination sensor and an inertial measurement unit.

29 Claims, 4 Drawing Sheets

(56) References Cited

U.S. PATENT DOCUMENTS

| | | | | |
|---|---|---|---|---|
| 8,331,624 | B2* | 12/2012 | Braunecker | G01C 1/04 |
| | | | | 382/106 |
| 8,754,805 | B2* | 6/2014 | Wang | G01C 15/00 |
| | | | | 342/52 |
| 8,897,482 | B2 | 11/2014 | Mein et al. | |
| 9,182,229 | B2* | 11/2015 | Grasser | G01C 15/00 |
| 9,189,838 | B2 | 11/2015 | Ligeti | |
| 9,322,652 | B2 | 4/2016 | Mein et al. | |
| 9,341,473 | B2* | 5/2016 | Zogg | G01C 15/002 |
| 9,367,962 | B2* | 6/2016 | Di Federico | G01C 11/00 |
| 9,513,120 | B2* | 12/2016 | Briggs | G01C 15/00 |
| 9,541,392 | B2* | 1/2017 | Dusha | G01C 15/06 |
| 9,562,764 | B2* | 2/2017 | France | G01C 15/00 |
| 9,683,832 | B2* | 6/2017 | Wang | G01C 15/00 |
| 9,846,035 | B2* | 12/2017 | Kotzur | G01C 1/04 |
| 10,041,793 | B2* | 8/2018 | Metzler | G06T 7/337 |
| 10,101,459 | B2* | 10/2018 | Latova | G01C 9/06 |
| 10,168,153 | B2* | 1/2019 | Grasser | G01C 15/06 |
| 10,337,865 | B2* | 7/2019 | Green | G01C 15/002 |
| 2011/0102255 | A1 | 5/2011 | Scherzinger | |
| 2013/0162469 | A1* | 6/2013 | Zogg | G01C 15/002 |
| | | | | 342/357.25 |
| 2014/0104602 | A1 | 4/2014 | Vogel et al. | |
| 2017/0067739 | A1* | 3/2017 | Siercks | G01C 15/002 |
| 2018/0017384 | A1* | 1/2018 | Siercks | G01C 15/002 |

OTHER PUBLICATIONS

Ibrahim Kalayci et al.,"A Novel Approach for Detail Surveys by the Motorized GPSSIT Concept for Residential Areas and its Application," Boletim de Ciências Geodésicas, vol. 20, No. 1, Jan./Mar. 2014, 12 pages.

Antonio M.G. Tommaselli et al., Automatic Orientation of Multi-Scale Terrestrial Images for 3D Reconstruction, Remote Sensing 2014,6, pp. 3020-3040.

Ken Joyce et al., White Paper: Trimble VISION, Trimble Engineering and Construction Group, Apr. 2012, 18 pages.

* cited by examiner

ENHANCED REMOTE SURVEYING SYSTEMS AND METHODS

TECHNICAL FIELD

The present invention relates generally to position measurement and surveying, and, more particularly, to an enhanced remote surveying technique using a hybrid measurement apparatus that combines a high-precision global navigation satellite system (GNSS) receiver, an electronic distance meter (EDM) and an optical camera.

BACKGROUND OF THE INVENTION

Today, GNSS and EDM are well-known technologies for survey positioning. Precision positioning with GNSS (e.g., the well-known Global Positioning System (GPS) operated in the United States) is commercially available using high-precision GNSS receivers capable of centimeter accuracy in geodetic and surveying applications.

However, the use of such high-precision GNSS receivers can be adversely impacted depending upon certain physical or line of sight factors. That is, the accuracy of such receivers diminishes when the lines-of-sight associated with one or more satellite signals pass through large structures (e.g., buildings), dense foliage, or other objects that effectively block or degrade the GNSS signals transmitted from the satellites. As such, deployment of high-precision GNSS in applications that may involve significant GNSS signal blocking and/or signal degradation can be challenging.

Of course, there are other existing location and surveying technologies that are not as severely impacted by such line of sight factors as noted above with respect to GNSS. An EDM is one established, commercially available device that is typically laser-based and the accuracy of which is derived from an internal reference frequency source (e.g., a crystal oscillator) that is subject to precise calibration. For example, using a well-known "intersection" surveying technique (hereinafter the "Intersection Method"), a user can select three (3) points that are GNSS-accessible and do not lie on a straight line and measure their coordinates with a GNSS receiver and, from the same points, measure the distance to the remote target point using an EDM and compute the three dimensional (3D) coordinates of the remote target point. One potential drawback of such an EDM technique is that it allows for the measurement of only one point at a time.

Another well-known technology that avoids line-of-sight effects is close range photogrammetry. Photogrammetry is a technique of making measurements from photographs and is used in surveying applications for determining terrestrial or 3D space position of points, and the distance and angles between them. Typically, these points are associated with positions of the surface of the Earth, and are used for a variety of land-based and aerial surveying applications. For example, a user might take two (2) photographs of certain target point(s), with a specially calibrated camera, from the same two (or more) locations as measured with a GNSS receiver, and then process the photographs using well-known photogrammetric software to determine the precise orientations of the cameras when the image were taken. Advantageously, the coordinates of all visible points can be measured from a single set of images. On the other hand, photogrammetry can be a time consuming process and requires a high degree of computational power that may limit its use with handheld devices in the field of operation. Also, the accuracy of this technique is severely impacted by certain highly reflective surfaces, and is heavily dependent upon the quality of the images used which may be adversely impacted by light conditions, image angles, and surface types, to name just a few.

Therefore, despite the advances in and availability of a variety of a surveying techniques and associated equipment, a need exists for an improved technique for increasing high-precision surveying accuracy, and in particular, with respect to remote multi-point applications in areas where the transmission of GNSS signals are blocked and/or degraded.

BRIEF SUMMARY OF THE EMBODIMENTS

In accordance with various embodiments, a method and apparatus is provided that utilizes a high-precision GNSS receiver, an EDM and an optical camera in combination for making accurate measurements of multiple remote target points associated with a selected target.

More particularly, in accordance with an embodiment, the accurate measurement of a plurality of remote points is facilitated by integrating a high-precision GNSS receiver, an EDM and an optical camera such that their combined physical location and orientation can be measured and known, and allowing for a single calibration thereof. This integration may take various forms such as a single, integrated device, or individual devices assembled together on a surveying pole, for example. In accordance with a further embodiment, the integrated device may also include one or more sensors such as an inclination sensor (i.e., inclinometer) and an inertial measurement unit (IMU) for further capturing orientation measurements such as slope angles (i.e., pitch and tilt) with respect to a ground surface. Hereinafter, the combination (with or without the optional sensor(s)) of the high-precision GNSS receiver, EDM and optical camera may also be referred to as the "Measurement Apparatus" for ease of explanation and illustration of the principles of the embodiments.

In accordance with an embodiment, the surveying and accurate measurement of multiple remote points is facilitated by using the high-precision GNSS receiver and EDM to measure one or more remote target points, and simultaneously with these measurements from the GNSS receiver, IMU (if so configured), and EDM capturing at least two (2) images of the remote target point(s) from the camera. As used herein, the term "simultaneously" means at the same time or concurrently, or substantially at the same time or concurrently taking into consideration operational or functional delays that may be associated with operating the surveying apparatus and/or the GNSS receiver, IMU, EDM and/or the optical camera. To begin, a target is selected for which precise measuring is desired and a set of target points associated with the target are selected. Illustratively, the selected target may be an object (e.g., building) or an area (e.g., an area encompassing one or more ground locations on a worksite) where the receipt and transmission of GNSS signals are adversely impacted in some fashion (e.g., blocked by a tall building). Further, at least three (3) measurement locations are selected, where such locations are not in a straight line (e.g., a serpentine formation) and from which the selected target and the selected remote target point(s) are visible and which measurement locations can be measured with the GNSS receiver. In embodiments where the Measurement Apparatus includes the optional sensors, only two (2) measurement locations are selected from which the selected target and the selected remote target point(s) are visible and which measurement locations can be measured with the GNSS receiver. In this way, the position measurements are supplemented with orientation measurements and used as a combined set.

Further, at least one so-called tie point is designated. As used herein, a tie point is a single point that will be utilized for measurement operations with respect to the plurality of remote target points wherein the tie point is a visually identifiable feature (e.g., a feature of the target object under observation), and easy to aim with the EDM from all of the selected measurement locations. As such, a tie point can by any point that has the visually identifiable and aiming features including, but not limited to, one or more of the remote target points. In this way, in one measurement setup and embodiment of the surveying apparatus, one can address large numbers of target points (e.g., hundreds or thousands representative of all elements of single structure) using a single tie point which is measurable from the Measurement Apparatus (in particular, the EDM). Of course, the utilization of additional tie points further increases measurement accuracy and the detection of measurements outliers that can be discarded.

Next, the Measurement Apparatus is positioned at one of the selected measurement locations. For each tie point, on an iterative basis, the respective tie point is targeted with the EDM and, on a simultaneous basis, position measurements (or position and orientation measurement if configured with the IMU) are taken from the EDM and the high-precision GNSS receiver together with capturing at least one (1) image of the selected target (and the remote target points associated therewith) from the camera.

Next, the Measurement Apparatus is positioned at another one (e.g., a second one) of the selected measurement locations. For each tie point, on an iterative basis, the respective tie point is targeted with the EDM and on a simultaneous basis measurements are taken from the EDM, IMU (if so configured) and the high-precision GNSS receiver together with capturing at least one (1) image of the selected target (and the remote target points associated therewith) from the camera.

After collecting the measurements and images from each of the at least two (or at least three in further embodiments) or more measurement locations, the 3D coordinates for each tie point are determined, and using the known coordinates of the selected measurement locations and the remote target points, the orientation of the Measurement Apparatus is computed for each measurement location. From the computed orientation of the Measurement Apparatus, the position and orientation of the camera at each measurement location is also computed. In this way, the relative positions and orientations of the GNSS receiver, IMU (if so configured), EDM and camera are known. Knowing such orientations, allows for measuring the coordinates of each remote target point that are visible in the at least 2 images by selecting the respective position of a particular target point on the images and computing the position of the target point using the Intersection Method.

Advantageously, a single set of simultaneous measurements are made (i.e., location/position measurements from GPS receiver and EDM, orientation measurements from any available IMU, and images from optical camera) from which the position of any remote target point can be determined provided such position can be located on at least two images as further detailed below. In this way, from each of a multiple number of locations of the surveying instrument there is a recordation of a single set of data measurements/observations using the Measurement Apparatus from which the position of any remote target can be located provided the target is locatable on at least two camera images. In addition, the target point positions are determined with a significant reduction in actual field/site work and without the need to access and/or traverse the selected target (e.g., a building or a worksite or some other selected object or area) with the Measurement Apparatus and/or visiting each and every target point within the selected area. Further, the disclosed embodiments allow for the reconfiguration of and extension of conventional GNSS surveying equipment for use in areas where GNSS signals are blocked or degraded and eliminate the need for the use of other equipment (e.g., well-known total stations) which can be expensive and further complicate the operations.

These and other advantages of the embodiments will be apparent to those of ordinary skill in the art by reference to the following detailed description and the accompanying drawings.

DETAILED DESCRIPTION

In accordance with various embodiments, a method and apparatus is provided that utilizes a high-precision GNSS receiver, an EDM and an optical camera in combination for making accurate measurements of multiple remote points.

Figure 1:
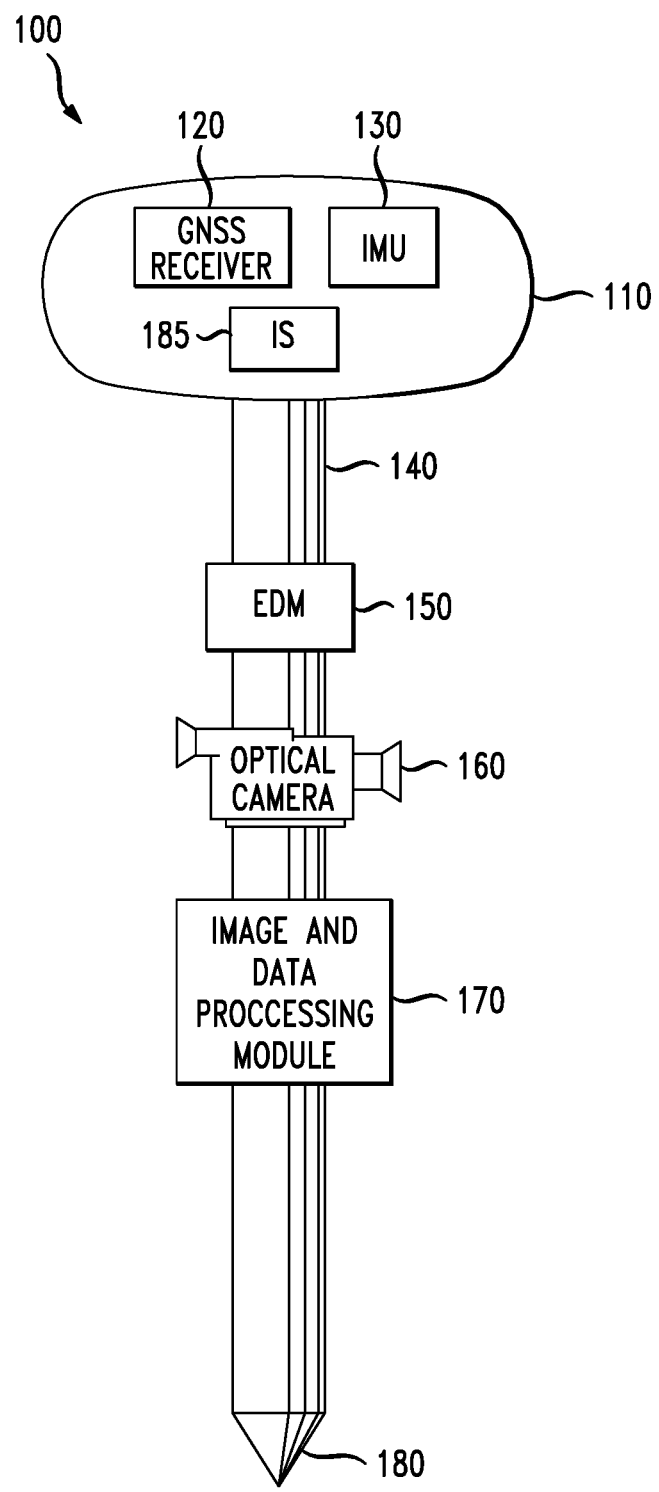
FIG. 1 shows a high-level block diagram of an illustrative surveying apparatus configured in accordance with an embodiment.
Figure 2:
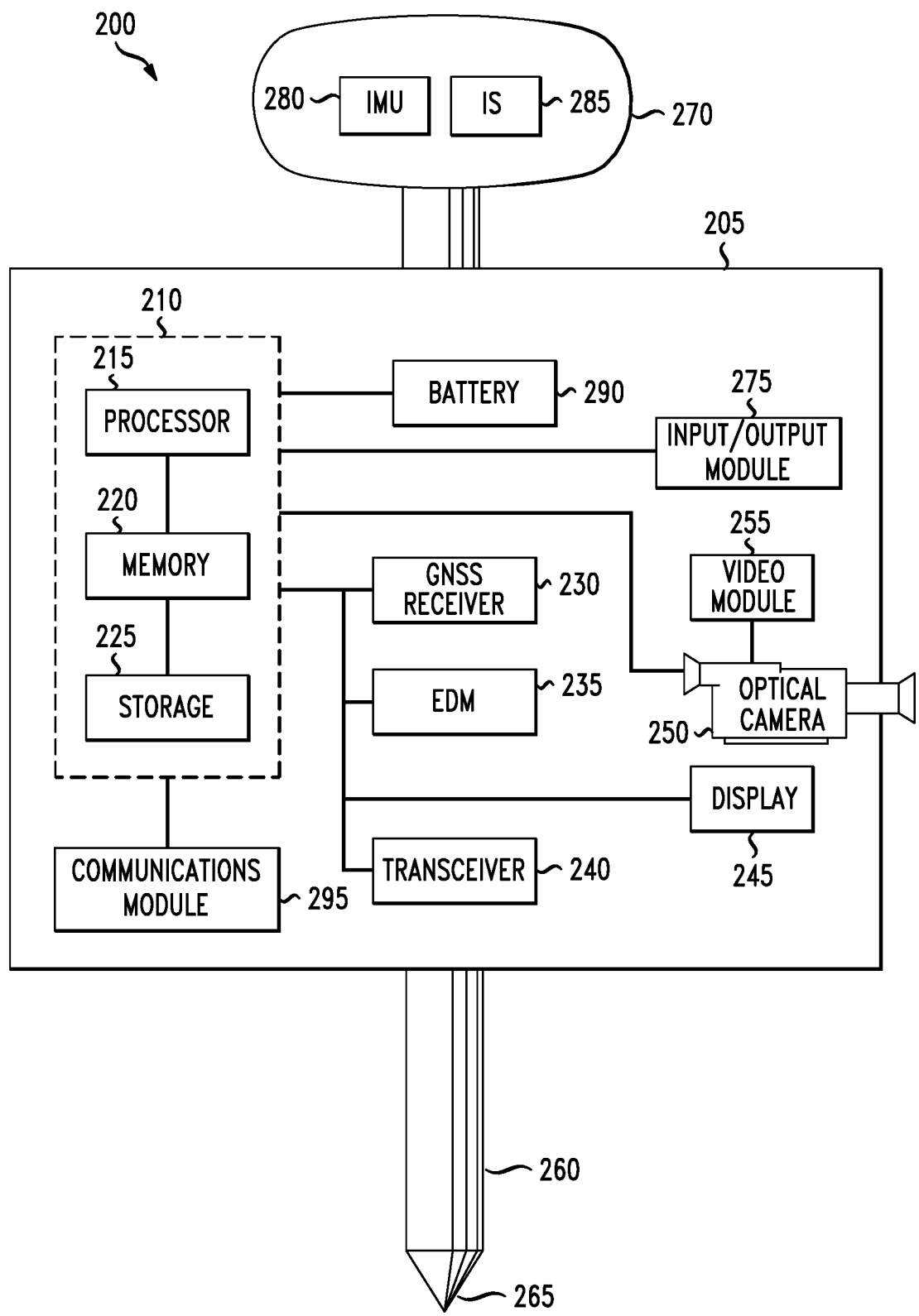
FIG. 2 shows a high-level block diagram of a further illustrative surveying apparatus configured in accordance with an embodiment.

FIG. 1 shows a high-level block diagram of an illustrative surveying apparatus 100 configured in accordance with an embodiment in which GNSS receiver 120 (e.g., a high-precision GNSS receiver), EDM 150 and optical camera 160 are individual components mounted on survey pole 140, and FIG. 2 shows a high-level block diagram of a further illustrative surveying apparatus 200 configured in accordance with an embodiment where GNSS receiver 230, EDM 235 and optical camera 250 are integrated within image and data processing unit 205. In accordance with either of these embodiments, the accurate measurement of a plurality of remote points is facilitated by integrating a high-precision GNSS receiver, an EDM and an optical camera such that their combined physical location and orientation can be measured and known, and allowing for single calibration thereof. As such, this integration may take various forms such as a single, integrated device as shown in FIG. 2, or individual devices assembled as shown in FIG. 1. For ease of explanation and understanding of the embodiments herein, these Figures will now be discussed together.

As shown in the embodiment of FIG. 1, surveying apparatus 100 is configured such that GNSS receiver 120, EDM 150 and optical camera 160 are individual components mounted on survey pole 140 having tip end 180. In addition, image and data processing unit 170 is also a separately mounted device that may include a processor (not shown) for controlling the overall operations of surveying apparatus 100 including but limited to the operations carried out by Measurement Apparatus defined by GNSS receiver 120, EDM 150 and optical camera 160. Also, position and sensor orientation unit 110 illustratively includes GNSS receiver 120, IMU 130 (an optional feature) and/or inclination sensor (IS) 185 (an optional feature) which is one of many configurations for GNSS receiver 120 and IMU 130. When equipped with inclination sensor 185 (e.g., inclinometer) and/or the IMU 130, surveying apparatus 100 may now make the further orientation measurements such as slope angles (i.e., a pitch and tilt angle) with respect to a ground surface (i.e., specific measurement position(s) associated with surveying apparatus 100). Again, as noted previously, integration of GNSS receiver 120, IMU 130, EDM 150 and optical camera 160 may take various forms such as a single, integrated device as shown in FIG. 2, or individual devices assembled as shown in FIG. 1, or different combinations of devices (e.g., integration of GNSS receiver 120 with IMU 130 as a single combined device, or integration of optical camera 160 with EDM 150 as single combined device, to name just a few possibilities).

FIG. 2 shows a high-level block diagram of a further illustrative surveying apparatus 200 configured in accordance with an embodiment where GNSS receiver 230, EDM 235 and optical camera 250 are integrated within image and data processing unit 205 which is mounted to survey pole 260 having tip end 265. In accordance with this embodiment, the Measurement Apparatus defined by GNSS receiver 230, EDM 235 and optical camera 250 is integral to image and data processing unit 205 which further includes processor 215 for controlling the overall operations of image and data processing unit 205, and surveying apparatus 200. Processor 215, illustratively part of a computation unit 210, may include both general and special purpose microprocessors, and may be the sole processor or one of multiple processors of image and data processing unit 205. Processor 215 may comprise one or more central processing units (CPUs), for example, and may include, be supplemented by, or incorporated in, one or more application-specific integrated circuits (ASICs) and/or one or more field programmable gate arrays (FPGAs).

Optical camera 250 (and/or optical camera 160) can be any type of camera, with one camera type preferably having a low distortion lens and high temperature stability, and may have one or more optical sensors, multiple optical elements and/or panoramic capabilities. For example, in accordance with an embodiment, optical camera 250 is a matrix Charge-Coupled Device (CCD) sensor the operation of which is well-known in the art, coupled with a suitable optical lens. Alternatively, optical camera 250 is a system of multiple CCD sensors coupled with respective lenses thereby providing a 360 degree or wide-angle image.

Position and sensor orientation unit 270 illustratively includes IMU 280 and inclination sensor (IS) 285 which is one of many configurations. Image and data processing unit 205 further includes video module 255 which may include a video semiconductor chip for providing compressed, digital video (e.g., MPEG-2) data from optical camera 250 to processor 215. Transceiver 240 may be any device for transmitting and receiving data over a communications link (e.g., wireless data link) in a conventional manner. Communications module 295 may provide a variety of capabilities such as Bluetooth® communications. Input-Output module 275 is a module which includes input means, such as a keypad, touchscreen, haptic controls, voice-recognition means and the like to facilitate user control and interaction with surveying apparatus 200 including but not limited by and through display 245. Battery 290 (e.g., lithium-ion) provides a power supply to the various components integrated within image and data processing unit 205.

Memory 220 and data storage device 225, illustratively part of computation unit 210, may each comprise a tangible non-transitory computer readable storage medium, high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices. In accordance with an embodiment, memory 220 and/or data storage device 225 store various types of information (e.g., image data from optical camera 250, and/or alphanumeric data or other types of data typically utilized by image and data processing unit 205 to carry out the operations of surveying apparatus 200.

Thus, in accordance with an embodiment, the accurate measurement of a plurality of remote points is facilitated by integrating GNSS receiver 230, EDM 235 and optical camera 250 such that their combined physical location and orientation can be measured and known, and allowing for single calibration thereof.

Figure 3:
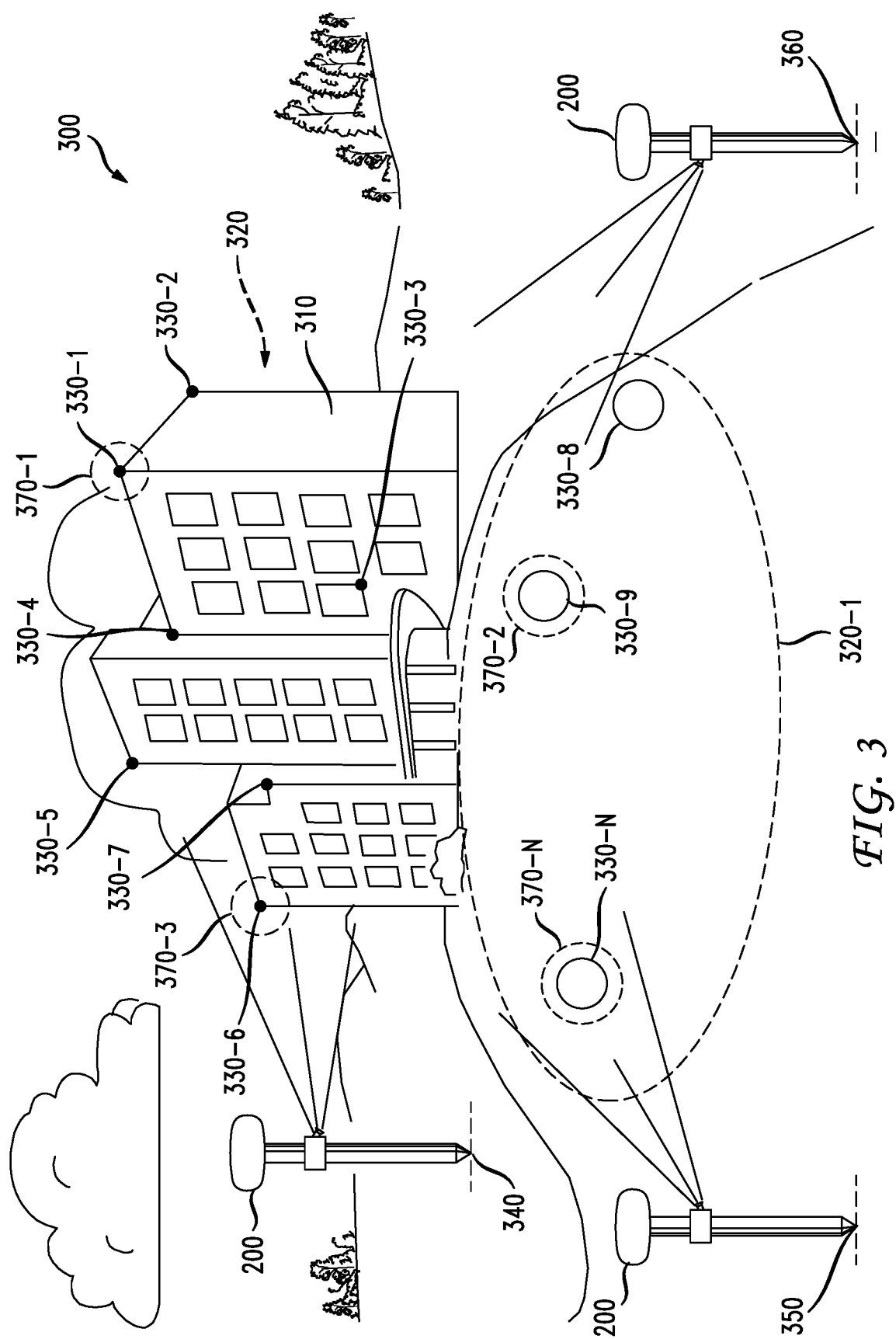
FIG. 3 shows a diagram of an illustrative surveying site using the surveying apparatus shown in FIG. 2 for locating the position of remote target points in accordance with an embodiment.

Surveying apparatus 200 is used for the surveying and accurate measurement of multiple remote points, associated with a selected target, by using GNSS receiver 230 and EDM 235 to measure one or more remote target points, and simultaneously with these measurements from GNSS receiver 230 and EDM 235 capturing at least two (2) images of the remote target point(s) from optical camera 250. To further illustrate the disclosed embodiments, FIG. 3 shows a diagram of an illustrative surveying site 300 using surveying apparatus 200, for locating a set of remote target points (i.e., remote target points 330-1, 330-2, 330-3, 330-4, 330-5, 330-6, 330-7, 330-8, 330-9 and 330-N). Further, at least one tie point is designated which tie point may be one of the remote target points (e.g., tie point 370-1 or 370-3 associated with building 310), or may be any other point (e.g., tie point 370-2 or 370-N) that is a visually identifiable feature of the selected target and for which an accurate measurement may be made from surveying apparatus 200 (i.e., any point at which EDM 235 may be accurately aimed).

More particularly, in accordance the illustrative example of FIG. 3, target 320 is selected for which precise measuring is desired (in this example, building 310 is the selected target) and from target 320 the associated set of remote target points are selected, e.g., remote target points 330-1 through 330-7. Illustratively, the target 320 is one where the receipt and transmission of GNSS signals are adversely impacted in some fashion. Further, at least three (3) measurement locations are selected, i.e., measurement locations 340, 350, and 360, where such locations are not in a straight line (e.g., a serpentine formation) and from which the selected target and the selected target point(s) are visible and can be measured with GNSS receiver 230, as part of surveying apparatus 200 shown at each respective measurement location. In embodiments where the Measurement Apparatus (i.e., GNSS receiver 230, EDM 235, and optical camera 250) includes optional sensors (e.g., IMU 280 and/or IS 285), only two (2) measurement locations need be selected (e.g., measurement location 340 and 360) from which selected target 320 and the selected target point(s) are visible and can be measured with GNSS receiver 230. When equipped with IS 285 (e.g., inclinometer) and/or IMU 280, surveying apparatus 200 may now make the further orientation measurements such as slope angles (i.e., a pitch and tilt angle) with respect to a ground surface (i.e., specific measurement position(s) associated with surveying apparatus 200). As such, in configurations including IMU 280 and/or IS 285, the position measurements are supplemented with orientation measurements. As will be appreciated, while the embodiments described above with or without the IMU involve the use of a respective minimum number of measurements locations (i.e., two or three) depending on the IMU configuration, any number of measurements locations can be utilized in either configuration provided that the respective minimum number of measurement location is satisfied. Further, while the illustrative embodiment uses building 310 as the selected target 320 it will be understood that the principles described herein are equally applicable to selected target 320-1 which is an area encompassing any number of other points (e.g., remote target points 330-8, 330-9 and 330-N), for example, resident in the vicinity in front of building 310.

As shown, surveying apparatus 200 is positioned at one of the selected measurement locations (e.g., measurement location 340). For each designated tie point, e.g., tie point 370-1 and/or 370-3, on an iterative basis, the respective tie point is targeted with EDM 235 (as part of surveying apparatus 200 shown at each respective measurement location), on a simultaneous basis, measurements are taken from EDM 235 and GNSS receiver 230 together with capturing at least one (1) image of target 320 (and remote target points 330-1 through 330-7) from optical camera 250.

Next, surveying apparatus 200 is positioned at the second one of the selected measurement locations (e.g. measurement location 360). For each designated tie point, e.g., tie point 370-1, on an iterative basis, the respective tie point is targeted with EDM 235 and on a simultaneous basis measurements are taken from EDM 235 and GNSS receiver 230 together with capturing at least one (1) image of the target 320 (and remote target points 330-1, 330-2, 330-3 and 330-7) from optical camera 250.

After collecting the measurements and images from each of the two locations (i.e., measurement location 340 and 360, respectively), the 3D coordinates for each designated tie point (e.g., tie point 370-1) are determined, illustratively using computation unit 210. As will be readily understood, the orientation may be computed by computation unit 210 using any number of well-known techniques such as a three-dimensional Intersection Method. In turn, using the known coordinates of measurement locations 340 and 360 and tie point 370-1, the orientation of the Measurement Apparatus (i.e., GNSS receiver 230, EDM 235, and optical camera 250) is computed for each measurement location. From the computed orientation of the Measurement Apparatus, the position and orientation of optical camera 250 at each measurement location is also computed, illustratively using computation unit 210 This computation, illustratively, is a straightforward geometric computation given that all parts of the Measurement Apparatus (i.e., GNSS receiver 230, EDM 235, and optical camera 250) are mutually calibrated. Initially, using the offset from GNSS receiver 230 (i.e., GNSS antenna phase center) to the EDM (i.e., EDM 235) nodal point (and with respect to which distances are measured), the coordinates of the EDM nodal point from the measured GNSS measurements are derived. Using these coordinates in combination with the tie point coordinates (e.g., tie point 370-1 coordinates), the orientation of the EDM (e.g., EDM 235) is determined. Next, knowing the offset of the camera nodal point (e.g., optical camera 250) with respect to the EDM, and the orientation of the camera axis with respect to the EDM axis (both being known from prior calibration thereof), the coordinates and orientation of the camera nodal point is derived. As will be appreciated, in embodiments which employ multiple tie points, a Least Squares adjustment or similar optimization technique can be utilized to obtain the best approximation of position and orientation.

In this way, the relative positions and orientations of GNSS receiver 230, EDM 235 and optical camera 255 are known. Knowing these orientations, and correcting for any distortions of the respective image(s) using any number of well-known techniques, allows for measuring the coordinates of each remote target point that are visible in the at least 2 images by selecting the respective position of a particular target point on the images and computing the position of the target point using the Intersection Method. As noted previously, the Intersection Method is a well-known technique that, in its most basic form, from each of two geo-referenced (i.e., positioned and oriented) images a ray is drawn which corresponds to the pixel position of the target point. In turn, the shortest line between 2 rays in space (a well-known mathematical operation with a single solution) is determined, and the middle of that shortest line is taken as the solution by this method in computing the position of the target point. In a more complicated form (e.g., in applications of more than 2 images), the Intersection Method will further utilize a Least Squares adjustment or other similar optimization technique to determine the middle point between the multiple rays in space.

Advantageously, a single set of simultaneous measurements are made (i.e., location/position measurements from GPS receiver 230 and EDM 230, and images from optical camera 250) from which the position of any remote target point can be determined provided such position can be located on at least two images as further detailed below. In this way, from each of a multiple number of locations of the surveying instrument (i.e., surveying apparatus 100 or surveying apparatus 200) there is a recordation of a single set of data measurements/observations using the Measurement Apparatus from which the position of any remote target can be located provided the target is locatable on at least two camera images. In addition, the target point positions are determined with a significant reduction in actual field/site work and without the need to traverse the selected area with the Measurement Apparatus and/or visiting each and every target point within the selected area. Further, the disclosed embodiments allow for the reconfiguration of and extension of conventional GNSS surveying equipment for use in areas where GNSS signals are blocked or degraded and eliminate the need for the use of other equipment (e.g., well-known total stations) which can be expensive and further complicate the operations.

Figure 4:
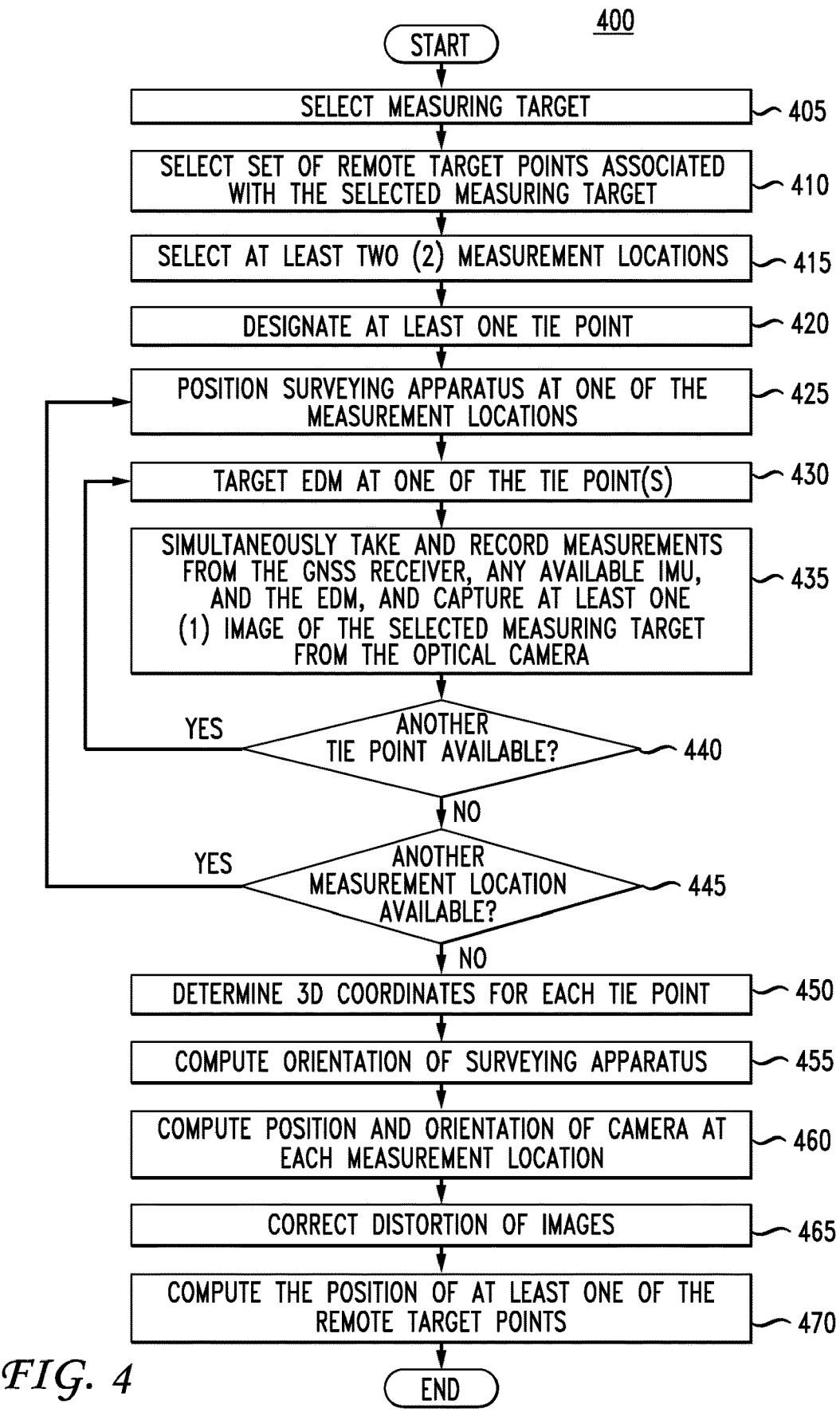
FIG. 4 shows a flowchart of illustrative operations for determining the position of remote target points in accordance with an embodiment.

FIG. 4 shows a flowchart of illustrative operations 400 for determining the position of remote target points in accordance with an embodiment. As shown, at step 405, the measuring target is selected, and at step 410, a set of remote target points is selected that are associated with the selected measuring target. At step 415, at least two (2) measurement locations are selected, and at step 420, at least one tie point is designated. At step 425, the surveying apparatus (e.g., surveying apparatus 100 or 200) is positioned at one of the measurement locations. As noted previously, while the embodiments described above with or without the IMU involve the use of a respective minimum number of measurements locations (i.e., two or three) depending on the IMU configuration, any number of measurements locations can be utilized in either configuration provided that the respective minimum number of measurement location is satisfied.

At step 430, an EDM (e.g., EDM 150 or EDM 235) is targeted at one of the tie points, and at step 435, measurements from the GNSS receiver (e.g., GNSS receiver 120 or 230) and the EDM (and the IMU, if so configured), and at least one (1) image is captured of the selected measuring area from an optical camera (e.g., optical camera 160 or 250), all on a simultaneous basis. A determination, at step 440, is made as to whether there is another designated tie point available and, if so, steps 430 and 435 are repeated. If no further designated tie points are available for measuring, a determination, at step 445, is made as to whether there is another measurement location available and, if so, steps 425 through 440 are repeated for any remaining measurement locations.

If all measurement locations have been analyzed, the 3D coordinates of each designated tie point is computed using, illustratively, the Intersection Method at step 450, and the orientation of the surveying apparatus is computed, at step 455, using the coordinates of the respective measurements location and the tie points. At step 460, the position and orientation of the camera at each respective measurement location is computed using the orientation of the surveying apparatus, the position measurements from the GNSS receiver, the orientation measurements from any available IMU, and the known relative positions and orientations of the GNSS receiver, the EDM and the optical camera. Any distortion of the images is corrected, at step 465, and at step 470, the position of at least one of the remote target points is computed as detailed above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining coordinates of a plurality of remote target points associated with a selected target in relation to a surveying apparatus, the surveying apparatus comprising at least a global navigation satellite system (GNSS) receiver, an electronic distance meter (EDM), an inertial measurement unit (IMU), and an optical camera, the method comprising:
   acquiring, by a processor, a designation of at least one tie point;
   using, by the processor, at least two measurement locations of a plurality of measurement locations associated with the surveying apparatus, and:
      at a first one of the measurement locations, from which the surveying apparatus has a view of at least the selected target,
         simultaneously (i) recording a first plurality of position and orientation measurements using the GNSS receiver, the IMU, and the EDM including a distance between the tie point and the first measurement location, and (ii) capturing at least a first one image of the selected target using the optical camera;
      at a second one of the measurement locations associated with the surveying apparatus, from which the surveying apparatus has a view of at least the selected target,
         simultaneously (i) recording a second plurality of position and orientation measurements using the GNSS receiver, the IMU, and the EDM including a distance between the tie point and the second measurement location, and (ii) capturing at least a second one image of the selected target using the optical camera;
   computing, by the processor, a set of three dimensional (3D) coordinates in a reference coordinate system for the tie point using the first plurality of position and orientation measurements, and the second plurality of position and orientation measurements;
   computing, by the processor, a first orientation of the surveying apparatus using the 3D coordinates for the tie point at the first measurement location;
   computing, by the processor, a second orientation of the surveying apparatus using the 3D coordinates for the tie point at the second measurement location;
   computing, by the processor, a first position and orientation of the optical camera using the first orientation of the surveying apparatus and the first plurality of position and orientation measurements at the first measurement location;
   computing, by the processor, a second position and orientation of the optical camera using the second orientation of the surveying apparatus and the second plurality of position and orientation measurements at the second measurement location; and
   computing, by the processor, a set of coordinates for at least one of the remote target points using at least the first one image, the second one image, the first position and orientation of the optical camera, and the second position and orientation of the optical camera.

2. The method of claim 1 wherein the tie point is a visually identifiable feature of the selected target and aimable by the EDM from each measurement location of the plurality of measurement locations.

3. The method of claim 2 further comprising:
   correcting a distortion in the first one image or the second one image.

4. The method of claim 3 wherein the computing the set of coordinates for at least one of the remote target points further comprises:
   locating the at least one of the remote target points on the first one image and the second one image.

5. The method of claim 4 wherein the correcting the distortion uses a plurality of calibration parameters associated with the optical camera.

6. The method of claim 1 wherein the optical camera is a sensor camera.

7. The method of claim 1 wherein the GNSS receiver, the EDM, the IMU, and the optical camera are each separate units operably connected on a survey pole of the surveying apparatus.

8. The method of claim 1 wherein the GNSS receiver, the EDM, the IMU, and the optical camera are integrated into one or more single units operably connected on a survey pole of the surveying apparatus.

9. A surveying apparatus for determining coordinates of a plurality of remote target points associated with a selected target in relation to the surveying apparatus, the surveying apparatus comprising:
a survey pole having a global navigation satellite system (GNSS) receiver, an electronic distance meter (EDM), an inertial measurement unit (IMU), and an optical camera operably connected thereto;
a processor;
a memory coupled with the processor, the memory storing computer program instructions that when executed cause the processor to perform operations for:
acquiring a designation of at least one tie point;
using at least two measurement locations of a plurality of measurement locations associated with the surveying apparatus, and:
acquiring, with respect to a first one of the measurement locations, a first plurality of position and orientation measurements and a first one image of the selected target, the first plurality of position and orientation measurements and the first one image having been simultaneously (i) recorded, with respect to the first plurality of position and orientation measurements, from the GNSS receiver, the IMU, and the EDM including a distance between the tie point and the first measurement location, and (ii) captured, with respect to the first one image of the selected target, from the optical camera;
acquiring, with respect to a second one of the measurement locations, a second plurality of position and orientation measurements and a second one image of the selected target, the second plurality of position and orientation measurements and the second one image having been simultaneously (i) recorded, in terms of the second plurality of position and orientation measurements, from the GNSS receiver, the IMU, and the EDM including a distance between the tie point and the second measurement location, and (ii) captured, in terms of the second one image of the selected target, from the optical camera;
computing a set of three dimensional (3D) coordinates in a reference coordinate system for the tie point using the first plurality of position and orientation measurements, and the second plurality of position and orientation measurements;
computing a first orientation of the surveying apparatus using the 3D coordinates for the tie point at the first measurement location;
computing a second orientation of the surveying apparatus using the 3D coordinates for the tie point at the second measurement location;
computing a first position and orientation of the optical camera using the first orientation of the surveying apparatus and the first plurality of position and orientation measurements at the first measurement location;
computing a second position and orientation of the optical camera using the second orientation of the surveying apparatus and the second plurality of position and orientation measurements at the second measurement location; and
computing a set of coordinates for at least one of the remote target points using at least the first one image, the second one image, the first position and orientation of the optical camera, and the second position and orientation of the optical camera.

10. The surveying apparatus of claim 9 wherein the survey pole is positioned such that the selected target is visible to the optical camera.

11. The surveying apparatus of claim 9 wherein the tie point is a visually identifiable feature of the selected target and is aimable by the EDM from each of the measurement locations of the plurality of measurement locations.

12. The surveying apparatus of claim 9 wherein any distortion in the first one image and the second one image is corrected.

13. The surveying apparatus of claim 12 wherein the tie point designated is one of the remote target points.

14. The surveying apparatus of claim 13 wherein the GNSS receiver, the EDM, the IMU, and the optical camera are each separate units operably connected on the survey pole.

15. The surveying apparatus of claim 9 wherein the GNSS receiver, the EDM, the IMU, and the optical camera are integrated into one or more single units operably connected to the survey pole.

16. A non-transitory computer-readable medium storing computer program instructions for determining coordinates of a plurality of remote target points associated with a selected target using a surveying apparatus, the surveying apparatus having a survey pole having a global navigation satellite system (GNSS) receiver, an electronic distance meter (EDM), an inertial measurement unit (IMU), and an optical camera operably connected thereto, the computer program instructions, when executed on a processor, cause the processor to perform operations comprising:
acquiring a designation of at least one tie point;
using at least two measurement locations of a plurality of measurement locations associated with the surveying apparatus and:
acquiring, with respect to a first one of the measurement locations, a first plurality of position and orientation measurements and a first one image of the selected target, the first plurality of position and orientation measurements and the first one image having been simultaneously (i) recorded, in terms of the first plurality of position and orientation measurements, from the GNSS receiver, the IMU, and the EDM including a distance between the tie point and the first measurement location, and (ii) captured, in terms of the first one image of the selected target, from the optical camera;
acquiring, with respect to a second one of the measurement locations, a second plurality of position and orientation measurements and a second one image of the selected target, the second plurality of position and orientation measurements and the second one image having been simultaneously (i) recorded, in terms of the second plurality of position and orientation measurements, from the GNSS receiver, the IMU, and the EDM including a distance between the tie point and the second measurement location, and (ii) captured, in terms of the second one image of the selected target, from the optical camera;
computing a set of three dimensional (3D) coordinates in a reference coordinate system for the tie point using the first plurality of position and orientation measurements, and the second plurality of position and orientation measurements;
computing a first orientation of the surveying apparatus using the 3D coordinates for the tie point at the first measurement location;

computing a second orientation of the surveying apparatus using the 3D coordinates for the tie point at the second measurement location;

computing a first position and orientation of the optical camera using the first orientation of the surveying apparatus and the first plurality of position and orientation measurements at the first measurement location;

computing a second position and orientation of the optical camera using the second orientation of the surveying apparatus and the second plurality of position and orientation measurements at the second measurement location; and computing a set of coordinates for at least one of the remote target points using at least the first one image, the second one image, the first position and orientation of the optical camera, and the second position and orientation of the optical camera.

17. The non-transitory computer-readable medium of claim 16 wherein the tie point is a visually identifiable feature and is aimable by the EDM from each measurement location of the plurality of measurement locations.

18. The non-transitory computer-readable medium of claim 16 wherein the operations further comprise:
correcting a distortion in the first one image or the second one image.

19. The non-transitory computer-readable medium of claim 16 wherein the GNSS receiver, the EDM, the IMU, and the optical camera are integrated into one or more single units operably connected to the survey pole.

20. A method for determining coordinates of a plurality of remote target points associated with a selected target in relation to a surveying apparatus, the surveying apparatus comprising at least a global navigation satellite system (GNSS) receiver, an electronic distance meter (EDM), and an optical camera, the method comprising:

acquiring, by a processor, a designation of at least one tie point;

using, by the processor, at least three measurement locations of a plurality of measurement locations associated with the surveying apparatus, and:

at a first one of the measurement locations, from which the surveying apparatus has a view of at least the selected target, simultaneously (i) recording a first plurality of position measurements using the GNSS receiver and the EDM including a distance between the tie point and the first measurement location, and (ii) capturing at least a first one image of the selected target using the optical camera;

at a second one of the measurement locations associated with the surveying apparatus, from which the surveying apparatus has a view of at least the selected target, simultaneously (i) recording a second plurality of position measurements using the GNSS receiver and the EDM including a distance between the tie point and the second measurement location, and (ii) capturing at least a second one image of the selected target using the optical camera;

at a third one of the measurement locations, from which the surveying apparatus has a view of at least the selected target, simultaneously (i) recording a third plurality of position measurements using the GNSS receiver and the EDM including a distance between the tie point and the third measurement location, and (ii) capturing a third one image of the selected target using the optical camera;

computing, by the processor, a set of three dimensional (3D) coordinates in a reference coordinate system for the tie point using the first plurality of position measurements, the second plurality of position measurements, and the third plurality of position measurements;

computing, by the processor, a first orientation of the surveying apparatus using the 3D coordinates for the tie point at the first measurement location;

computing, by the processor, a second orientation of the surveying apparatus using the 3D coordinates for the tie point at the second measurement location;

computing, by the processor, a third orientation of the surveying apparatus using the 3D coordinates for the tie point at the third measurement location;

computing, by the processor, a first position and orientation of the optical camera using the first orientation of the surveying apparatus and the first plurality of position measurements at the first measurement location;

computing, by the processor, a second position and orientation of the optical camera using the second orientation of the surveying apparatus and the second plurality of position measurements at the second measurement location;

computing, by the processor, a third position and orientation of the optical camera using the third orientation of the surveying apparatus and the third plurality of position measurements at the third measurement location; and computing, by the processor, a set of coordinates for at least one of the remote target points using at least the first one image, the second one image, the third one image, the first position and orientation of the optical camera, and the second position and orientation of the optical camera, and the third position and orientation of the optical camera.

21. The method of claim 20 wherein the tie point is a visually identifiable feature of the selected target and is aimable by the EDM from each measurement location of the plurality of measurement locations.

22. The method of claim 20 further comprising:
correcting a distortion in the first one image, the second one image, or the third one image.

23. The method of claim 20 wherein the GNSS receiver, the EDM, and the optical camera are integrated into one or more single units operably connected on a survey pole of the surveying apparatus.

24. The method of claim 20 wherein the optical camera is a sensor camera.

25. A surveying apparatus for determining coordinates of a plurality of remote target points associated with a selected target in relation to the surveying apparatus, the surveying apparatus comprising:

a survey pole having a global navigation satellite system (GNSS) receiver, an electronic distance meter (EDM), and an optical camera operably connected thereto;

a processor;

a memory coupled with the processor, the memory storing computer program instructions that when executed cause the processor to perform operations for:

acquiring a designation of at least one tie point;

using at least three measurement locations of a plurality of measurement locations associated with the surveying apparatus, and:

acquiring, with respect to a first one of the measurement locations, a first plurality of position measurements and a first one image of the selected target, the first plurality of position measurements and the first one image having been simultaneously (i) recorded, with respect to the first plurality of position measurements, from the GNSS receiver and the EDM including a distance between the tie point and the first measurement location, and (ii) captured, with respect to the first one image of the selected target, from the optical camera;

acquiring, with respect to a second one of the measurement locations, a second plurality of position measurements and a second one image of the selected target, the second plurality of position measurements and the second one image having been simultaneously (i) recorded, in terms of the second plurality of position measurements, from the GNSS receiver and the EDM including a distance between the tie point and the second measurement location, and (ii) captured, in terms of the second one image of the selected target, from the optical camera;

acquiring, with respect to a third one of the measurement locations, a third plurality of position measurements and a third one image of the selected target, the third plurality of position measurements and the third one image having been simultaneously (i) recorded, in terms of the third plurality of position measurements, from the GNSS receiver and the EDM including a distance between the tie point and the third measurement location, and (ii) captured, in terms of the third one image of the selected target, from the optical camera;

computing a set of three dimensional (3D) coordinates in a reference coordinate system for the tie point using the first plurality of position measurements, the second plurality of position measurements, and the third plurality of position measurements;

computing a first orientation of the surveying apparatus using the 3D coordinates for the tie point at the first measurement location;

computing a second orientation of the surveying apparatus using the 3D coordinates for the tie point at the second measurement location;

computing a third orientation of the surveying apparatus using the 3D coordinates for the tie point at the third measurement location;

computing a first position and orientation of the optical camera using the first orientation of the surveying apparatus and the first plurality of position measurements at the first measurement location;

computing a second position and orientation of the optical camera using the second orientation of the surveying apparatus and the second plurality of position measurements at the second measurement location;

computing a third position and orientation of the optical camera using the third orientation of the surveying apparatus and the third plurality of position measurements at the third measurement location; and computing a set of coordinates for at least one of the remote target points using at least the first one image, the second one image, the third one image, the first position and orientation of the optical camera, the second position and orientation of the optical camera, and the third position and orientation of the optical camera.

26. The surveying apparatus of claim 25 wherein the survey pole is positioned such that the selected target is visible to the optical camera from each of the first measurement location, the second measurement location, and the third measurement location.

27. The surveying apparatus of claim 25 wherein the tie point is a visually identifiable feature and is aimable by the EDM from the first measurement location, the second measurement location, and the third measurement location.

28. The surveying apparatus of claim 25 wherein any distortion in the first one image, the second one image, and the third one image is corrected.

29. The surveying apparatus of claim 25 wherein the GNSS receiver, the EDM, and the optical camera are integrated into one or more single units operably connected on the survey pole.

* * * * *